US011493590B2

(12) United States Patent
Roukos et al.

(10) Patent No.: US 11,493,590 B2
(45) Date of Patent: Nov. 8, 2022

(54) ELECTRONICALLY ALIGNED WIDEBAND TRACKING MODULATOR SYSTEM

(71) Applicant: The Boeing Company, Chicago, IL (US)

(72) Inventors: Daniel Steven Roukos, Hermosa Beach, CA (US); Christ Tzelepis, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 16/845,528

(22) Filed: Apr. 10, 2020

(65) Prior Publication Data
US 2021/0318408 A1    Oct. 14, 2021

(51) Int. Cl.
| G01S 5/02 | (2010.01) |
| H01Q 3/36 | (2006.01) |
| H01Q 13/02 | (2006.01) |
| G01S 7/40 | (2006.01) |
| G01S 3/42 | (2006.01) |
| H01Q 1/12 | (2006.01) |
| G01S 3/04 | (2006.01) |

(52) U.S. Cl.
CPC .......... G01S 5/0294 (2013.01); G01S 3/043 (2013.01); G01S 3/42 (2013.01); G01S 7/4004 (2013.01); H01Q 1/1257 (2013.01); H01Q 3/36 (2013.01); H01Q 13/025 (2013.01)

(58) Field of Classification Search
CPC ...... G01S 5/0294; G01S 7/4004; G01S 3/043; G01S 3/42; H01Q 1/1257; H01Q 3/36; H01Q 13/025

USPC ................. 343/755, 745, 771, 700 MS, 786; 333/195, 24.1; 342/372
See application file for complete search history.

(56) References Cited

U.S. PATENT DOCUMENTS

| 7,728,784 | B2* | 6/2010 | Mohamadi | ........... H04B 7/0617 333/24.1 |
| 8,049,674 | B2 | 11/2011 | Tzelepis et al. | |
| 2007/0279294 | A1* | 12/2007 | York | ............ H01Q 21/0075 343/700 MS |
| 2015/0214615 | A1* | 7/2015 | Patel | ............. H01Q 3/443 342/372 |

OTHER PUBLICATIONS

Wideband Analog Phase Shifters Cover 2 to 24 GHz, Microwave JI, Feb. 5, 2011, Hittite Microwave Corp (Year: 2011).*

* cited by examiner

Primary Examiner — Arnold M Kinkead
(74) Attorney, Agent, or Firm — Sage Patent Group

(57) ABSTRACT

An electronically aligned wideband tracking modulator system is described. The wide band tracking modulator system comprises a waveguide coupled to an antenna. The wide band tracking modulator system also comprises waveguide tuning circuitry configured to convert RF energy from a waveguide of the wideband tracking modulator system into an RF signal that can be processed by the waveguide tuning circuitry. The waveguide tuning circuitry is also configured to shift a phase of the RF signal. The waveguide tuning circuitry is further configured to convert the phase-shifted RF signal into phase-shifted RF energy and return the phase-shifted RF energy to the waveguide to electrically align the wideband tracking modulator system.

21 Claims, 7 Drawing Sheets

ELECTRONICALLY ALIGNED WIDEBAND TRACKING MODULATOR SYSTEM

The present disclosure relates generally to wideband tracking modulator systems. Specifically, the present disclosure relates to electronically aligned wideband tracking modulator systems.

BACKGROUND

Wideband tracking antenna systems track the position of high gain radio frequency (RF) antennas that provide and receive highly directional electromagnetic waves or beams. High gain RF antennas can have desirable high sensitivity to the reception of highly directional electromagnetic waves or beams. However, these antennas must be precisely pointed in the correct direction to properly receive the highly directional electromagnetic waves or beams. Even minor pointing errors can significantly degrade the performance of high gain RF antennas.

U.S. Pat. No. 8,049,674, the disclosure of which is incorporated by reference, describes an antenna tracking system comprising a wideband tracking modulator that can be used to modulate an electromagnetic signal proportionally to a pointing error of an antenna. FIG. 1A illustrates a first perspective of a wideband tracking modulator 12 as described in U.S. Pat. No. 8,049,674. FIG. 1A also illustrates a tracking feed horn antenna 10 that receives incoming signals and feeds the signals into modulator 12 via a common port 14 of a cylindrically shaped circular waveguide section 16. The output port 18 feeds into a mode filter 20.

The mode filter 20 feeds into a polarizer 21 and an orthomode transducer 22. The latter two elements separate the two senses of circular polarization, left and right, into two different channels. A circular to rectangular transducer 24 allows received signals in the two senses to be carried to signal processing equipment (not shown) through different rectangular waveguides. The modulator 12 further includes at least a pair of side arms 26. The pair of side arms 26 is coupled to the waveguide section 16 by a pair of coupling slots 28, to couple the electromagnetic signal between the waveguide section 16 and the pair of side arms 26. FIG. 1A illustrates one pair of side arms removed. FIG. 1B illustrates the modulator 12 not attached to the antenna structure.

Each of the side arms 26 are coupled to a filter structure 30 to filter out any primary transverse electric (TE) mode signals coupled to the side arms 26. The side arms 26 are further coupled to a phase shifter 31 to shift the phase of the coupled signal. A terminator 32 is used to terminate the phase shifter. The phase shifter 31 shifts the phase of the coupled higher order TE mode signal by 90 degrees. Alternatively, the phase shifter 31 shifts a higher order TE21 mode signal to a primary TE11 mode signal. The converted TE11 mode signal exits out of the output port 18 of the waveguide section 16. The converted TE11 mode signal is used as an input to the control system of the tracking system to change positioning of the antenna in order to minimize the amplitude of the TE21 mode signal coupled to side arms. This substantially aligns the antenna's boresight axis with the direction of the incoming signal wave front beam.

However, the phase shifters of wideband tracking modulator 12 require precise physical features to maintain accurate phase relationships between the wideband tracking modulator 12 and the antenna's boresight axis. At high RF bands, such as 18 GHz and above, physical feature tolerance can become very challenging and require tuning. Such tuning can only be accomplished by obtaining alternate mechanical parts or a re-machining of the existing physical structure of the waveguide of the modulator. Replacement or re-machined parts also must be thoroughly tested each time they are replaced to determine if the re-tuning was successful. In addition, the waveguide cannot be tuned during operation. Thus, existing methods of aligning wideband tracking modulators using existing physical tuning methods are cost prohibitive and difficult to implement.

SUMMARY

According to embodiments of the present disclosure, a waveguide tuning circuitry is described. The waveguide tuning circuitry comprises a radio frequency (RF) transition configured to convert RF energy from a waveguide of a wideband tracking modulator system into an RF signal that can be processed by the waveguide tuning circuitry. The waveguide tuning circuitry also comprises an adjustable phase shift circuitry configured to receive the RF signal from the RF transition and to shift a phase of the RF signal. The waveguide tuning circuitry further comprises return circuitry configured to return the phase-shifted RF signal to the RF transition. The RF transition is further configured to convert the phase-shifted RF signal into phase-shifted RF energy and return the phase-shifted RF energy to the waveguide to electrically align the wideband tracking modulator system.

According to some embodiments, a wideband tracking modulator system is also described. The wideband tracking modulator system comprises a waveguide coupled to an antenna. The wideband tracking modulator system also comprises waveguide tuning circuity configured to convert RF energy from a waveguide of the wideband tracking modulator system into an RF signal that can be processed by the waveguide tuning circuitry. The waveguide tuning circuitry is also configured to shift a phase of the RF signal. The waveguide tuning circuitry is further configured to convert the phase-shifted RF signal into phase-shifted RF energy and return the phase-shifted RF energy to the waveguide to electrically align the wideband tracking modulator system.

According to some embodiments, the present disclosure further describes a method performed by a wideband tracking modulator system. The method includes converting RF energy from a waveguide of the wideband tracking modulator system into an RF signal that can be processed by waveguide tuning circuitry of the waveguide. The method also includes shifting a phase of the RF signal using the waveguide tuning circuitry. The method also includes converting, using the waveguide tuning circuitry, the phase-shifted RF signal into phase-shifted RF energy. The method further includes electrically aligning the wideband tracking modulator system by returning the phase-shifted RF energy to the waveguide using the waveguide tuning circuitry.

The methods, devices, and systems described herein simplify the manufacturing process of wideband tracking modulator systems by enabling the wideband tracking modulator systems to be built at higher frequency bands at less expense. In addition, the methods, devices, and systems described herein enable the wideband tracking modulator systems to be constructed for use at previously impossible high frequency bands. The electronically aligned wideband tracking modulators and systems described herein also able to be tuned during a shorter cycle time with less complexity and quantity of precision mechanical parts.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The accompanying drawings, which are included to provide a further understanding of the disclosure and are incorporated in and constitute a part of this application, illustrate certain non-limiting embodiments of the present disclosure. In the drawings.

DETAILED DESCRIPTION

Inventive concepts will now be described more fully hereinafter with reference to the accompanying drawings, in which examples of embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 2:
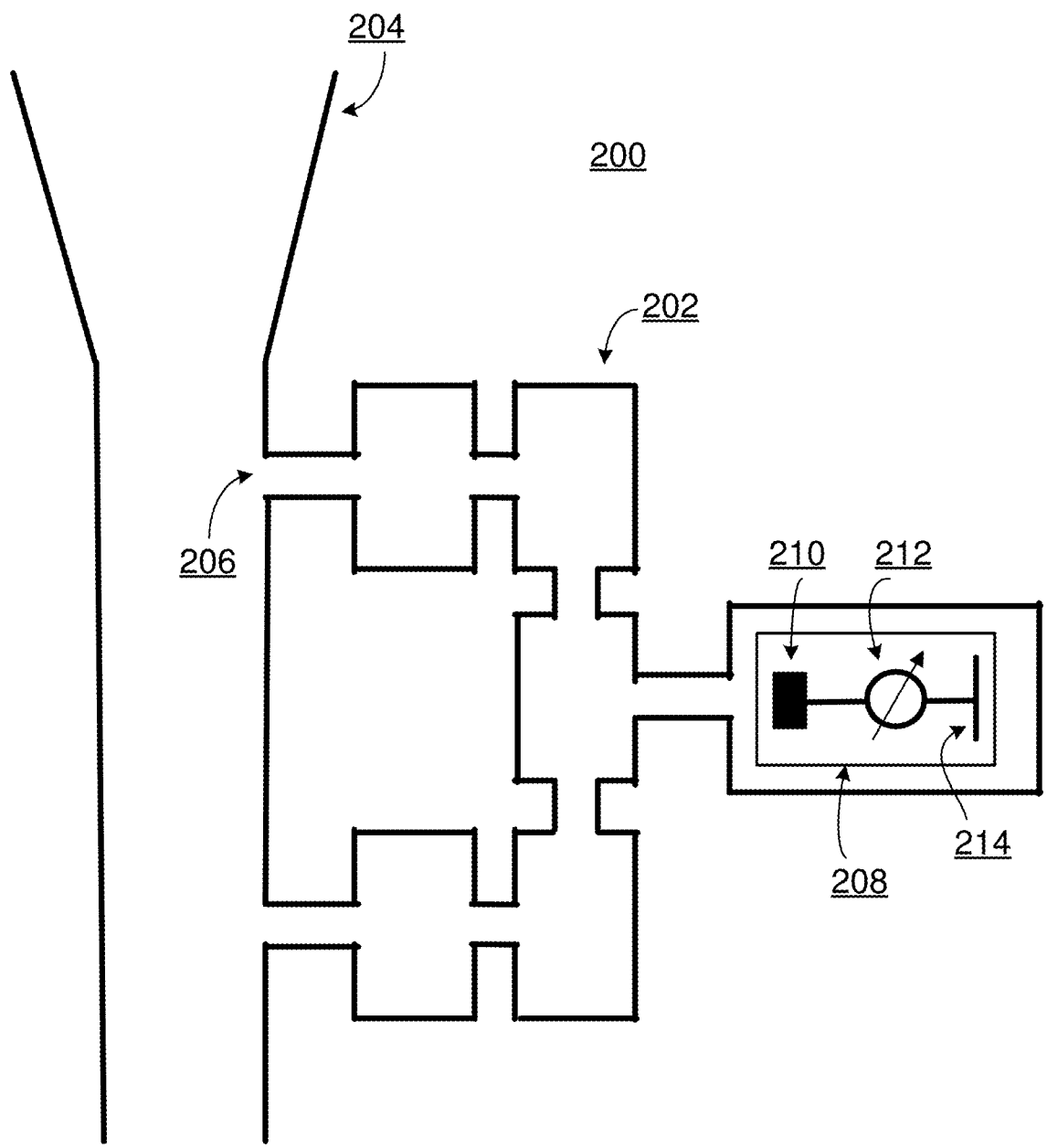
FIG. 2 is a diagram of an example wideband tracking modulator system comprising waveguide tuning circuitry in accordance with embodiments of the present disclosure.

A wideband tracking modulator system according to embodiments of the present disclosure is now described. The wideband tracking modulator system comprises a waveguide coupled to an antenna. For example, FIG. 2 illustrates a cross-sectional view of a waveguide of wideband tracking modulator system 200 comprising a waveguide 202 coupled to antenna 204 via coupling slots 206. It should be understood that the structure of waveguide 202 illustrated in FIG. 2 is for illustrative purposes only. Other waveguide structures may be utilized depending upon the application environment desired. FIG. 2 also illustrates example antenna 204 comprising a horn for receiving incoming electromagnetic (EM) signals and passes the incoming electromagnetic signals through the main horn structure. The coupling slots 206 couple energy of the EM signals in alternate RF modes into waveguide 202.

The wideband tracking modulator system also comprises waveguide tuning circuitry in accordance with embodiments. Continuing the previous example, FIG. 2 illustrates wideband tracking modulator system 200 comprising waveguide tuning circuitry 208. According to embodiments, the waveguide tuning circuitry is installed either within the waveguide or on an exterior of the waveguide. In some embodiments, the waveguide tuning circuitry is installed within a coupling arm of the waveguide or on an exterior of the coupling arm of the waveguide. For example, FIG. 2 illustrates waveguide tuning circuitry 208 installed within a coupling arm of the waveguide 202. In this example, waveguide tuning circuitry 208 is installed within an interior cavity of a coupling arm of waveguide 202.

The waveguide tuning circuitry is configured to convert RF energy from a waveguide of the wideband tracking modulator system into an RF signal that can be processed by the waveguide tuning circuitry according to embodiments. For example, FIG. 2 illustrates that waveguide tuning circuitry 208 is configured to convert RF energy from waveguide 202 of the wideband tracking modulator system 200 into an RF signal that can be processed by waveguide tuning circuitry 208. In this example, FIG. 2 illustrates waveguide tuning circuitry 208 comprising an RF transition 210 configured to convert RF energy from waveguide 202 into an RF signal that can be processed by waveguide tuning circuitry 208.

In some embodiments, the waveguide tuning circuitry comprises a miniature microwave integrated circuit (MMIC). In such an embodiment, the RF transition couples energy from the waveguide cavity onto the MMIC. The RF transition may comprise a waveguide-coax adapter, microstrip antenna, or any other RF structure that converts propagation modes of RF energy into the mode of the relevant transmission medium of the MMIC (e.g., circuit board, chip, coaxial structure, etc.). In some implementations, the MMIC could receive power and control signaling from small wire bonds that would extend onto the MMIC chip from the edges of the chip connected to a circuit board or a substrate next to the chip.

According to embodiments, the waveguide tuning circuitry is configured to shift a phase of the RF signal. For example, FIG. 2 illustrates waveguide tuning circuitry 208 configured to shift a phase of the RF signal. The waveguide tuning circuitry 208 comprises an adjustable phase shift circuitry 212 configured to receive the RF signal from the RF transition 210 and to shift a phase of the RF signal according to embodiments. In some embodiments, the adjustable phase shift circuitry 212 is configured to alter the modulation of the RF signal. For example, by quickly changing the amount of the phase shift (i.e., delay) from one phase shift amount to another utilizing the adjustable phase shift circuitry 212, the modulation of the RF signal can be altered.

The waveguide tuning circuitry is further configured to convert the phase-shifted RF signal into phase-shifted RF energy and return the phase-shifted RF energy to the waveguide to electrically align the wideband tracking modulator system according to embodiments. In accordance with embodiments, the waveguide tuning circuitry comprises return circuitry configured to return the phase-shifted RF signal to the RF transition. For example, FIG. 2 also illustrates waveguide tuning circuitry 208 comprising return circuitry 214 configured to return the phase-shifted RF signal to RF transition 210. The RF transition is further configured to convert the phase-shifted RF signal into phase-shifted RF energy and return the phase-shifted RF energy to the waveguide to electrically align the wideband tracking modulator system in accordance with embodiments. The phase-shifted RF signal couples back into the main feed structure of the antenna horn and sums (or cancels) with the originating signal depending on the phase of the originating signal.

According to some embodiments, the waveguide tuning circuitry is further configured to shift the phase of the RF signal based on control signaling received from the wideband tracking modulator system. For example, waveguide tuning circuitry 208 illustrated in FIG. 2 is configured to shift the phase of the RF signal based on control signaling (not shown) received from wideband tracking modulator system 200. The adjustable phase circuitry 212 is further configured to shift the phase of the RF signal based, at least in part, on control signaling received from a control system of the wideband tracking modulator system. Control signaling may be received from a control system of the wideband tracking modulator system as discussed in further detail below with regard to FIG. 6.

Figure 3:
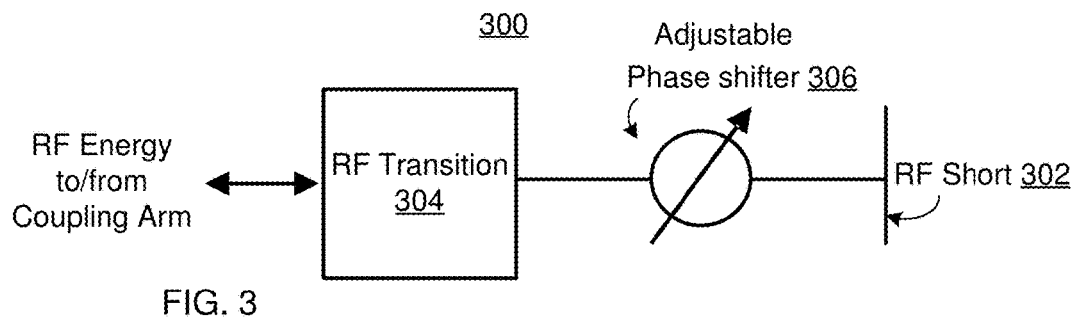
FIG. 3 is a circuit diagram of an example waveguide tuning circuitry in accordance with some embodiments of the present disclosure.

In some embodiments, the return circuitry comprises an RF short configured to reflect the phase-shifted RF signal back to the RF transition through the adjustable phase shift circuitry. For example, FIG. 3 illustrates an example waveguide tuning circuitry 300 comprising an RF short 302 configured to reflect the phase-shifted RF signal back to RF transition 304 through adjustable phase shifter 306. The RF short 302 may comprise one of a short plate or coax short. In this example, the adjustable phase shifter 306 shifts a phase of the RF signal twice: once when the RF signal is received from RF transition 304 and again as the reflected RF signal from RF short 302 passes through the adjustable phase shifter 306 back to RF transition 304. Thus, the adjustable phase shifter 306 is placed within the included transmission line utilized to precision align the RF energy used in the wideband tracking modulator system. This enables precision correlation of the tracking modulator error signals with the antenna boresight. The adjustable phase shifter may comprise, but is not limited to, a stepped phase shifter, all pass filters, or switchable delay lines.

Figure 4:
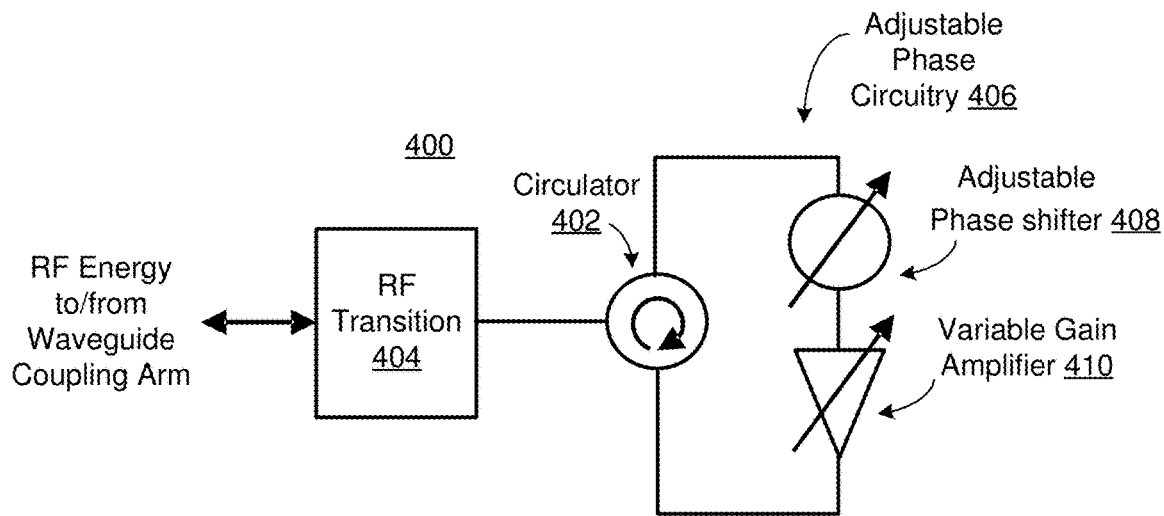
FIG. 4 is a circuit diagram of an example waveguide tuning circuitry in accordance with some other embodiments of the present disclosure.

Alternatively, the return circuitry comprises a circulator coupled between the RF transition and the adjustable phase shift circuitry. The circulator is configured to return the phase-shifted RF signal from the adjustable phase shift circuity to the RF transition. For example, FIG. 4 illustrates an example waveguide tuning circuitry 400 comprising a circulator 402 coupled between RF transition 404 and adjustable phase shift circuitry 406. Energy that enters circulator 402 from RF transition 404 exits out the top port of the circulator 402. Energy that enters circulator 402 from adjustable phase shift circuitry 406, or the bottom port of circulator 402, will exit out the left port of the circulator 402 toward RF transition 404.

In some embodiments, the adjustable phase circuitry comprises an adjustable phase shifter and a variable gain amplifier. Continuing the previous example, FIG. 4 illustrates adjustable phase circuitry 406 comprising an adjustable phase shifter 408 and a variable gain amplifier 410. The adjustable phase shifter 408 and variable gain amplifier 410 are configured to receive control signaling that controls how the adjustable phase shifter 408 and a variable gain amplifier 410 alter the phase and amplitude modulation of the RF signal. In this example, adjustable phase shifter 408 and a variable gain amplifier 410 are configured to receive control signaling from wideband tracking modulator system 200 and to shift the phase and adjust the amplitude modulation of the RF based on the control signaling as discussed in further detail with regard to FIG. 6 below. A benefit of the variable gain amplifier is that it can adjust amplitude which may be useful in tuning out amplitude imbalances in the system. It also provides gain which may be useful if the wideband tracking modulator system is very lossy at high RF bands.

Figure 5:
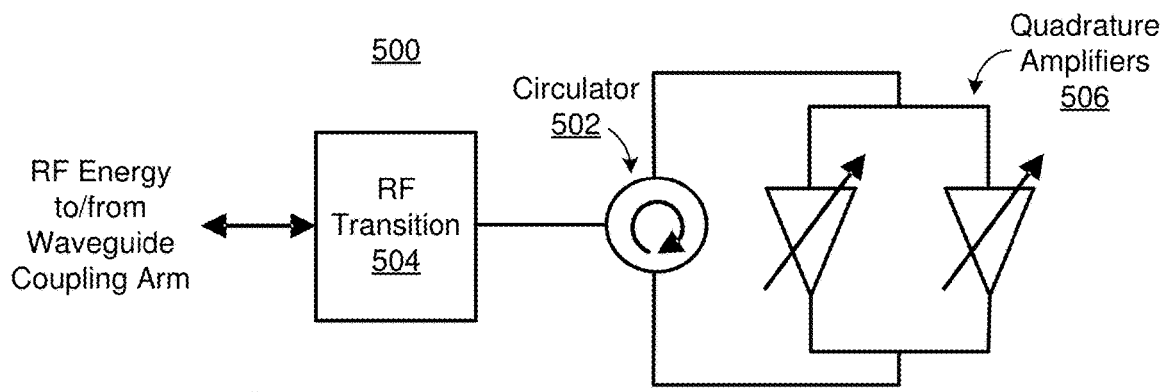
FIG. 5 is a circuit diagram of an example waveguide tuning circuitry in accordance with some other embodiments of the present disclosure.

Alternatively, the adjustable phase circuitry comprises quadrature amplifiers arranged to shift a phase of the RF signal. For example, FIG. 5 illustrates an example waveguide tuning circuitry 500 comprising a circulator 502 coupled between RF transition 504 and quadrature amplifiers 506. As shown in FIG. 5, quadrature amplifiers 506 comprise at least two variable gain amplifiers coupled in parallel. For example, a vector sum of the amplitudes of the variable gain amplifiers changes the phase of the RF signal. The quadrature amplifiers are configured to receive control signaling that controls how the quadrature amplifiers alter the phase and amplitude modulation of the RF signal. In this example, quadrature amplifiers 506 are configured to receive control signaling from wideband tracking modulator system 200 and to shift the phase and adjust the amplitude modulation of the RF based on the control signaling as discussed in further detail with regard to FIG. 6 below. In this embodiment, the quadrature amplifiers can adjust phase more accurately (in smaller steps and with better resolution) than traditional phase shifter topologies. They can also adjust amplitude which may be useful in tuning out amplitude imbalances in the wideband tracking modulator system. Additionally, they also provide gain which may be useful if the system is very lossy at high RF bands.

The waveguide tuning circuitry is further configured to adjust a modulation of the RF signal based, at least in part, on control signaling received from the wideband tracking modulator system according to embodiments. For example, waveguide tuning circuitry 208 illustrated in FIG. 2 is configured to adjust a modulation of the RF signal based, at least in part, on control signaling (not shown) received from wideband tracking modulator system 200. The adjustable phase circuitry 212 of the waveguide tuning circuitry 208 is configured to adjust a modulation of the RF signal based, at least in part, on control signaling received from the wideband tracking modulator system 200 according to embodiments as discussed in further detail below with regards to FIG. 6. The adjustable phase circuitry enables tuning of the wideband tracking modulator system and structure which also affects the amplitude modulation (AM) by changing the phase of the coupled energy of the waveguide to sum or cancel with the main signal from the antenna horn. The AM modulation is proportional to antenna pointing error and can be directly measured by the wideband tracking modulator system to ascertain the pointing error of the antenna.

Figure 6:
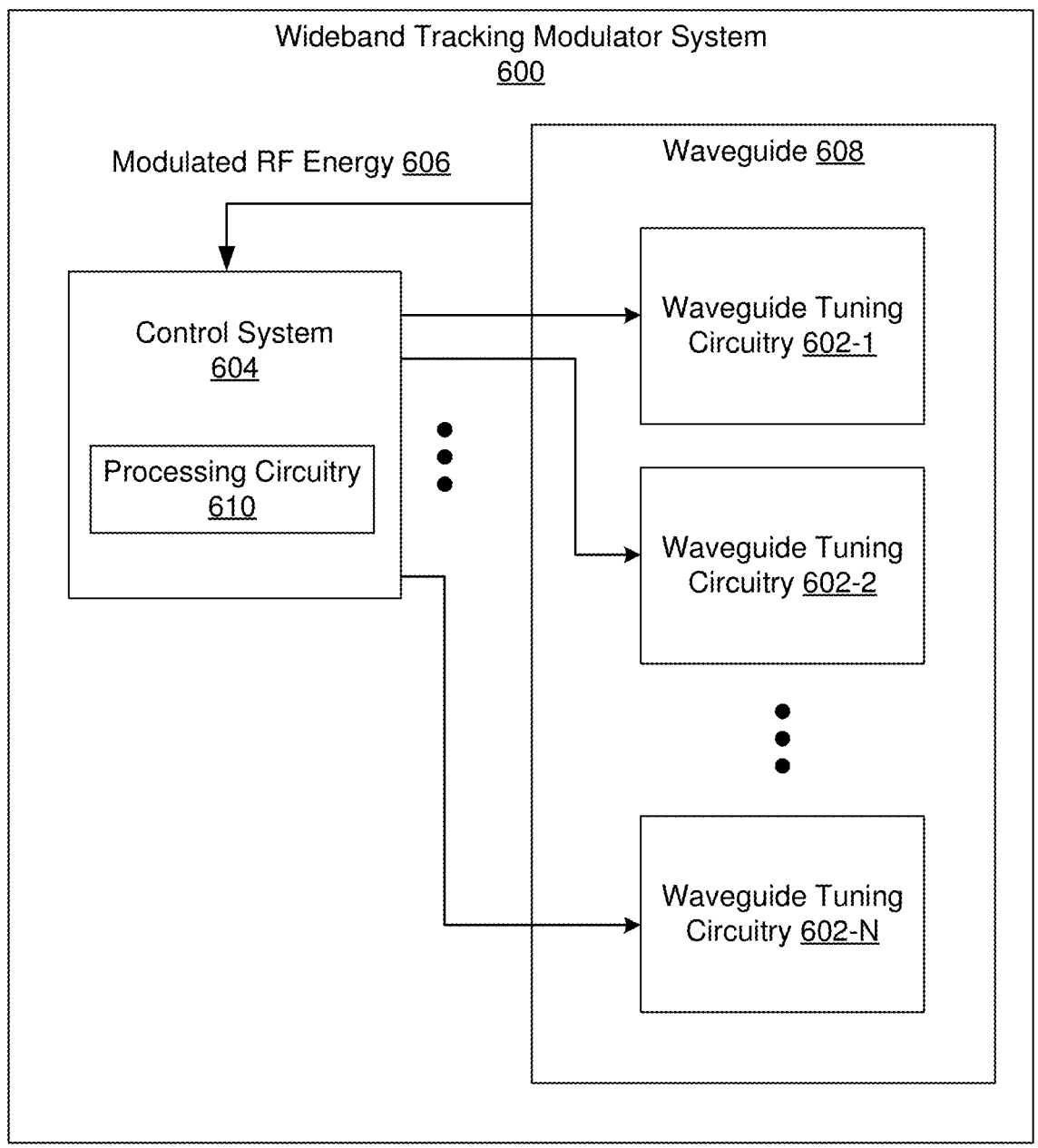
FIG. 6 is a block diagram of an example wideband tracking modulator system in communication with a control system in accordance with embodiments of the present disclosure.

According to embodiments, the wideband tracking modulator system comprises a plurality of coupling arms. Each coupling arm from the plurality of coupling comprises waveguide tuning circuitry installed either within each coupling arm or on an exterior of each coupling arm. Although not shown, waveguide 202 illustrated in FIG. 2 may comprise a plurality of coupling arms, each coupling arm comprising a waveguide tuning circuity 208 installed within. FIG. 6 is a block diagram of an example wideband tracking modulator system 600 comprising waveguide tuning circuitries 602-1 through 602-N, each corresponding to a coupling arm from the plurality of coupling arms (not shown) of a waveguide 608 of wideband tracking modulator system 600. Each of the waveguide tuning circuitries 602-1 through 602-N are configured to convert RF energy from a coupling arm of waveguide 608 into an RF signal that can be processed by the waveguide tuning circuitry of the coupling arm, shift a phase of the RF signal, convert the phase-shifted RF signal into phase-shifted RF energy, and return the phase-shifted RF energy to the coupling arm of waveguide 608 to electrically align wideband tracking modulator system 600.

Each waveguide tuning circuitry of each coupling arm from the plurality of coupling arms is configured to shift the phase of the RF signal based on control signaling received from the wideband tracking modulator system according to embodiments. For example, FIG. 6 illustrates waveguide tuning circuitries 602-1 through 602-N which shift the phase of the RF signal based on control signaling received from control system 604 of wideband tracking modulator system 600. In this example, control system 604 receives the modulated RF energy 606 from waveguide 608 and sends control signaling that determines the amount of phase each of waveguide tuning circuitries 602-1 through 602-N shift the RF signal to electronically align wideband tracking modulator system 600. Also, according to embodiments, each waveguide tuning circuitry of each coupling arm from the plurality of coupling arms is configured adjust a modulation of the RF signal based on control signaling received from the wideband tracking modulator system. Continuing the previous example, waveguide tuning circuitries 602-1 through 602-N are configured to adjust a modulation of the RF signal based on control signaling received from control system 604. Similarly, as described above, control system 604 receives the modulated RF energy 606 from waveguide 608 and sends control signaling that controls how each of waveguide tuning circuitries 602-1 through 602-N adjusts the modulation of each RF signal to electronically align the wideband tracking modulator system 600.

In some implementations, each waveguide tuning circuitry receives the control signaling from small wire bonds that would extend onto a chip comprising the waveguide tuning circuitry from the edges of the chip and are connected to a circuit board or a substrate next to the chip. Alternatively, the control lines may be connected directly to a top face or a back face of the chip. Wires may couple small wire bonds between the control system 604 and the small wire bonds of each waveguide tuning circuitry. The wires may feed through a small hole into the portion of the cavity of the waveguide comprising the waveguide tuning circuitry.

Figure 7:
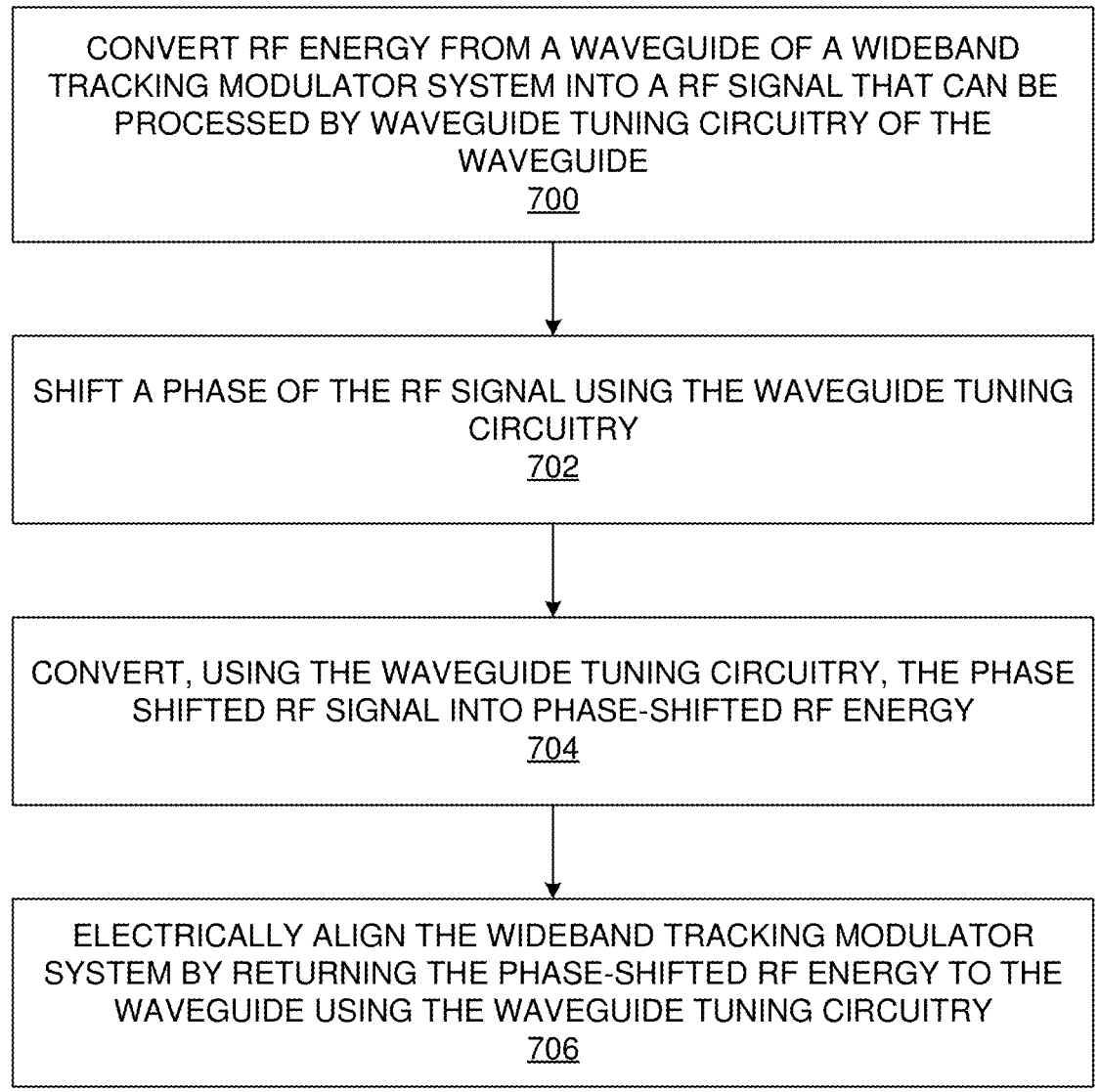
FIG. 7 is a flowchart of a method of electrically aligning a wideband tracking modulator system in accordance with embodiments of the present disclosure.

FIG. 7 illustrates a method performed by a wideband tracking modulator system according to embodiments of the present disclosure as described herein. The method includes converting 700 RF energy from a waveguide of a wideband tracking modulator system into an RF signal that can be processed by waveguide tuning circuitry of the waveguide. As described above, the example wideband tracking modulator systems 200 and 600 convert RF energy from waveguides 202 and 608 of wideband tracking modulator systems 200 and 600 respectively into an RF signal that can be processed by waveguide tuning circuitries 208 and 602-1 through 602-N, respectively. The method also includes, as shown in FIG. 7, shifting 702 a phase of the RF signal using the waveguide tuning circuitry. Also described above, example wideband tracking modulator systems 200 and 600 shift a phase of the RF signal using waveguide tuning circuitries 208 and 602-1 through 602-N, respectively.

The method also includes converting 704, using the waveguide tuning circuitry, the phase-shifted RF signal into phase-shifted RF energy, as shown in FIG. 7. Wideband tracking modulator systems 200 and 600 convert, using waveguide tuning circuitries 208 and 602-1 through 602-N respectively, phase-shifted RF signals into phase-shifted RF energy as discussed above with regards to FIGS. 2 and 6, respectively. Returning to FIG. 7, the method further includes electrically aligning 706 the wideband tracking modulator system by returning the phase-shifted RF energy to the waveguide using the waveguide tuning circuitry. Wideband tracking modulator systems 200 and 600 described above are electrically aligned by returning the phase-shifted RF energy or energies to waveguides 202 and 608 using waveguide tuning circuitries 208 and 602-1 through 602-N, respectively.

Figure 8:
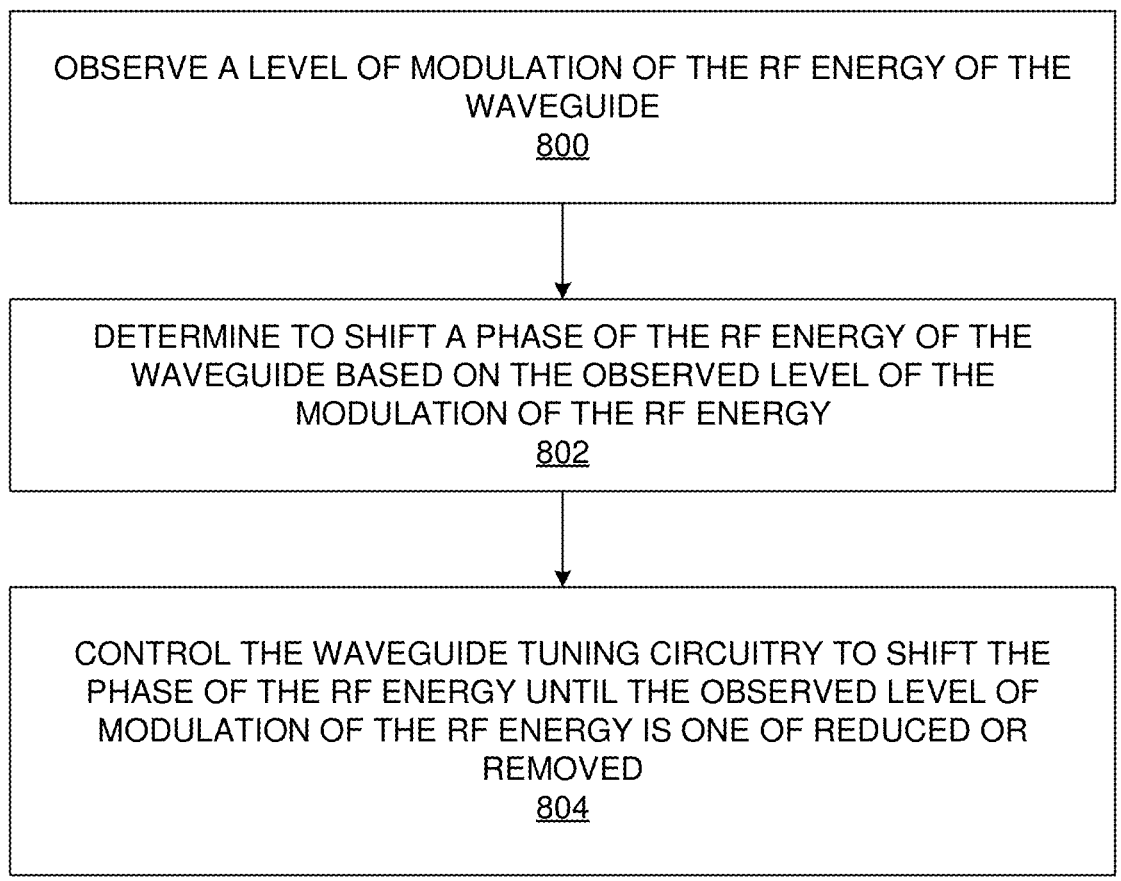
FIG. 8 is a flowchart of a method of controlling the waveguide tuning circuitry to shift the phase of the RF energy until the observed level of modulation of the RF energy is one of reduced or removed in accordance with embodiments of the present disclosure.

FIG. 8 illustrates a method including observing 800 a level of modulation of the RF energy of the waveguide according to some embodiments. For example, example control system 604 of wideband tracking modulator system 600 is configured to observe a level of modulation of the RF energy of waveguide 608. As shown in FIG. 6, control system 604 receives modulated RF energy 606 from waveguide 608 and observes a level of modulation of RF energy 606 from waveguide 608. Returning to FIG. 8, the method also includes determining 802 to shift a phase of the RF energy of the waveguide based on the observed level of modulation of the RF energy according to embodiments. For example, control system 604 determines to shift a phase of the modulated RF energy 606 of waveguide 608 based on the observed level of modulation of the modulated RF energy 606. The control system 604 may determine to adjust an amount of phase shift needed to completely remove or significantly reduce the level of observed modulation of the RF energy 606. Thus, during initial tuning the antenna is pointed in a known configuration and the phase shifts are adjusted based on observed modulation levels to tune the wideband tracking modulator.

Figure 1A:
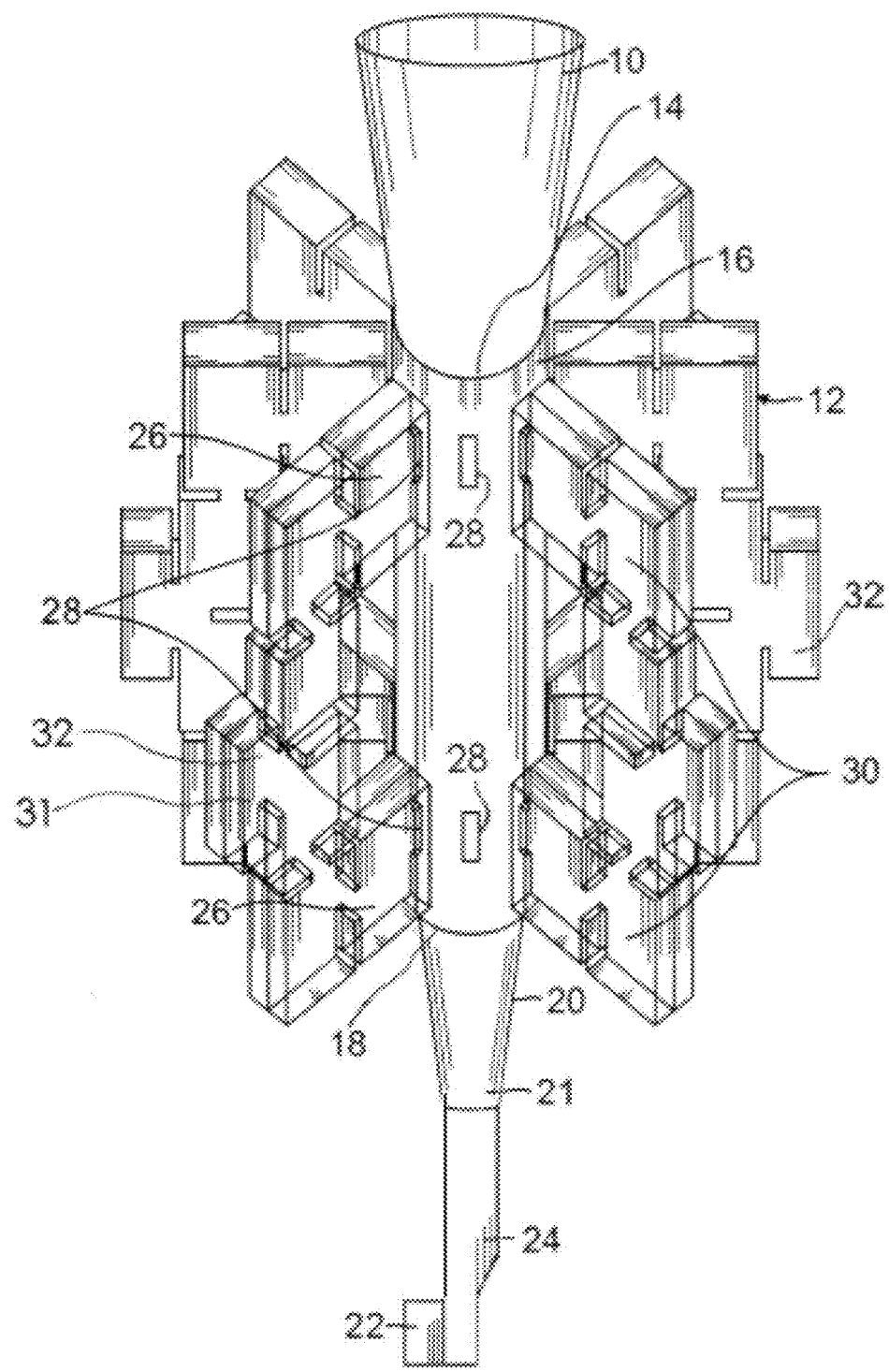
FIG. 1A is a first perspective view of a known wideband tracking modulator system.
Figure 1B:
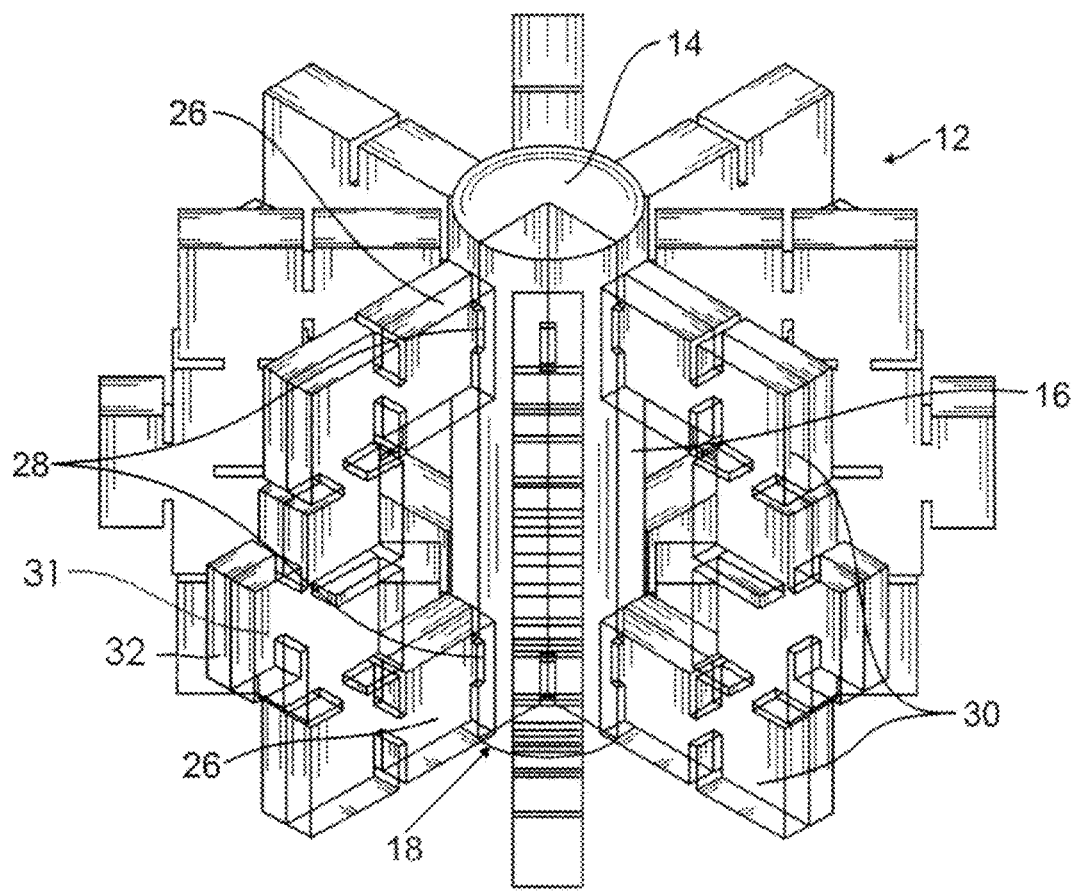
FIG. 1B is a second perspective view of a known wideband tracking modulator system.

Returning to FIG. 8, the method also includes controlling 804 the waveguide tuning circuitry to shift the phase of the RF energy until the observed level of modulation of the RF energy is one of reduced or removed. Continuing the previous example, control system 604 controls one or more of waveguide tuning circuitries 602-1 through 602-N to shift the phase of RF energy 606 until the observed level of modulation of the RF energy 606 is one of reduced or removed. In some embodiments, the method includes observing a level of modulation of RF energy of each coupling arm from the plurality of coupling arms of the waveguide. As discussed above, waveguide 608 comprises a plurality of coupling arms, and each coupling arm from the plurality of coupling arms comprises one of waveguide tuning circuitries 602-1 through 602-N, installed either within each coupling arm or on an exterior of each coupling arm from the plurality of coupling arms. In this example, control system 604 observes a level of modulation of RF energy received from each coupling arm from the plurality of coupling arms (not shown) of waveguide 608. Thus, the RF energy of each coupling arm can be sensed independently. For example, control system 604 is configured to flip the phase in a selected coupling arm of waveguide 608 which causes a modulation in the RF signal. Based on identification of the selected coupling arm and the observed modulation in the RF signal, adjustments to the phase of the coupling arm can be made as discussed herein. It should be understood that waveguide 608 may comprise, but is not limited to, a plurality of coupling arms similar to the waveguides illustrated in FIG. 1 discussed above.

In some embodiments, the method also includes determining to shift the phase of the RF energy of a coupling arm from the plurality of coupling arms based on the observed level of modulation of the RF energy of the coupling arm. Continuing the previous example, control system 604 determines to shift the phase of the RF energy of a coupling arm, such as a coupling arm associated with waveguide tuning circuitry 602-1 of the plurality of coupling arms based on the observed level of modulation of the RF energy of the coupling arm. In some implementations, control system 604 determines to shift the phase of the RF energy of two or more coupling arms from the plurality of coupling arms based on the observed level of modulation of the RF energy of the two or more coupling arms.

In some embodiments, the method also includes controlling the waveguide tuning circuitry of the coupling arm to shift the phase of the RF energy of the coupling arm from the plurality of coupling arms until the observed level of modulation of the RF energy of the coupling arm is one of reduced or removed. Continuing the previous example, control system 604 controls waveguide tuning circuitry 602-1 to shift the phase of the RF energy of a coupling arm comprising waveguide tuning circuitry 602-1 until the observed level of modulation of the RF energy of the coupling arm is one of reduced or removed. This procedure is repeated for each principal axis of the antenna system boresight to reduce or remove observed levels of modulation of RF energy at each principal axis prior to deployment into the field. In addition, the procedure is performed across a full scan volume of the antenna. In some embodiments, the control system 604 may store the amount of phase shift determined for each coupling arm at each principal axis to utilize during field deployment of the antenna and the wideband tracking modulator system. During operation in the field, the modulation is observed, and the tracking system makes decisions about how to change the pointing of the antenna based on measurement of the modulation. The wideband tracking modulator system switches between known phase states to create the modulation but it is no longer changing phases based on measurement of the modulation. Selection of the know phase states may also be based on measurements of the boresight of antenna 204. Measurements of the boresight of antenna 204 may comprise peak search measurements and contour mapping of the boresight of antenna 204.

According to some embodiments, control system 604 comprises processing circuitry adapted to perform the operations described above. For example, FIG. 6 illustrates control system 604 comprising processing circuitry 610 adapted to perform the operations described herein. In some embodiments, the processing circuitry comprises a processor and a memory. The memory comprises executable instructions that when executed by the processor causes the processor to perform operations as described herein. In some embodiments, the control system 604 comprises a computer program product comprised on a non-transitory computer-readable medium that, when executed by a processor of the control system 604, causes the processor to perform the operations described herein.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

We claim:

1. A waveguide tuning circuitry, comprising:
  a radio frequency (RF) transition configured to convert RF energy from a waveguide of a wideband tracking modulator system into an RF signal that can be processed by the waveguide tuning circuitry, wherein the waveguide comprises a cavity;
  adjustable phase shift circuitry configured to receive the RF signal from the RF transition and shift a phase of the RF signal, wherein the adjustable phase shift circuitry allows tuning during operation; and
  return circuitry configured to return a phase-shifted RF signal to the RF transition, wherein the RF transition is further configured to convert the phase-shifted RF signal into phase-shifted RF energy and return the phase-shifted RF energy to the waveguide to electrically align the wideband tracking modulator system; and wherein the waveguide tuning circuitry is installed either within the waveguide or on an exterior of the waveguide, or the waveguide tuning circuit is installed either within a coupling arm of the waveguide or on an exterior of the coupling arm.

2. The waveguide tuning circuitry of claim 1, wherein the return circuitry comprises an RF short configured to reflect the phase-shifted RF signal back to the RF transition through the adjustable phase shift circuitry.

3. The waveguide tuning circuitry of claim 1, wherein the return circuitry comprises a circulator coupled between the RF transition and the adjustable phase shift circuitry, and wherein the circulator is configured to return the phase-shifted RF signal from the adjustable phase shift circuitry to the RF transition.

4. The waveguide tuning circuitry of claim 3, wherein the adjustable phase shift circuitry comprises an adjustable phase shifter and a variable gain amplifier.

5. The waveguide tuning circuitry of claim 4, wherein the adjustable phase shift circuitry comprises quadrature amplifiers configured to shift a phase of the RF signal.

6. The waveguide tuning circuitry of claim 1, wherein the adjustable phase shift circuitry is further configured to shift the phase of the RF signal based, at least in part, on control signaling received from the wideband tracking modulator system.

7. The waveguide tuning circuitry of claim 6, wherein the adjustable phase shift circuitry is further configured to adjust a modulation of the RF signal based, at least in part, on control signaling received from the wideband tracking modulator system.

8. A wideband tracking modulator system, comprising:
a waveguide coupled to an antenna, wherein the waveguide comprises a cavity; and
waveguide tuning circuitry configured to:
convert RF energy from the waveguide into an RF signal that can be processed by the waveguide tuning circuitry;
shift a phase of the RF signal, where the waveguide tuning circuitry comprises adjustable phase shift circuitry that allows tuning during operation; and
convert a phase-shifted RF signal into phase-shifted RF energy and return the phase-shifted RF energy to the waveguide to electrically align the wideband tracking modulator system; and
wherein the waveguide tuning circuitry is installed either within the waveguide or on an exterior of the waveguide, or the waveguide tuning circuit is installed either within a coupling arm of the waveguide or on an exterior of the coupling arm.

9. The wideband tracking modulator system of claim 8, wherein the waveguide tuning circuitry is further configured to shift the phase of the RF signal based, at least in part, on control signaling received from the wideband tracking modulator system.

10. The wideband tracking modulator system of claim 9, wherein the waveguide tuning circuitry is further configured to adjust a modulation of the RF signal based, at least in part, on control signaling received from the wideband tracking modulator system.

11. The wideband tracking modulator system of claim 8, wherein the waveguide comprises a plurality of coupling arms, and wherein each coupling arm from the plurality of coupling arms comprises waveguide tuning circuitry installed either within each coupling arm or on an exterior of each coupling arm.

12. The wideband tracking modulator system of claim 11, wherein each waveguide tuning circuitry of each coupling arm from the plurality of coupling arms is configured to:
convert RF energy of a coupling arm into an RF signal that can be processed by the waveguide tuning circuitry of the coupling arm;
shift a phase of the RF signal;
convert the phase-shifted RF signal into phase-shifted RF energy; and
return the phase-shifted RF energy to the coupling arm to electrically align the wideband tracking modulator system.

13. The wideband tracking modulator system of claim 12, wherein each waveguide tuning circuitry of each coupling arm from the plurality of coupling arms is further configured to shift the phase of the RF signal based, at least in part, on control signaling received from the wideband tracking modulator system.

14. The wideband tracking modulator system of claim 13, wherein each waveguide tuning circuitry of each coupling arm from the plurality of coupling arms is further configured to adjust a modulation of the RF signal based, at least in part, on control signaling received from the wideband tracking modulator system.

15. A method performed by a wideband tracking modulator system, the method comprising:
converting RF energy from a waveguide of the wideband tracking modulator system into an RF signal that can be processed by waveguide tuning circuitry of the waveguide, wherein the waveguide comprises a cavity;
shifting a phase of the RF signal using the waveguide tuning circuitry, where the waveguide tuning circuitry comprises adjustable phase shift circuitry that allows tuning during operation;
converting, using the waveguide tuning circuitry, a phase-shifted RF signal into phase-shifted RF energy; and
electrically aligning the wideband tracking modulator system by returning the phase-shifted RF energy to the waveguide using the waveguide tuning circuitry; and
wherein the waveguide tuning circuitry is installed either within the waveguide or on an exterior of the waveguide, or the waveguide tuning circuit is installed either within a coupling arm of the waveguide or on an exterior of the coupling arm.

16. The method of claim 15, further comprising:
observing a level of modulation of the RF energy of the waveguide;
determining to shift a phase of the RF energy of the waveguide based on the observed level of modulation of the RF energy; and
controlling the waveguide tuning circuitry to shift the phase of the RF energy until the observed level of modulation of the RF energy is one of reduced or removed.

17. The method of claim 16, wherein the waveguide comprises a plurality of coupling arms, each coupling arm from the plurality of coupling arms comprising waveguide tuning circuitry installed either within each coupling arm or on an exterior of each coupling arm.

18. The method of claim 17, wherein said observing the level of modulation of the RF energy comprises observing a level of modulation of RF energy of each coupling arm from the plurality of coupling arms;

wherein said determining to shift the phase of the RF energy comprises determining to shift the phase of the RF energy of a coupling arm from the plurality of coupling arms based on the observed level of modulation of the RF energy of the coupling arm; and wherein said controlling the waveguide tuning circuitry to shift the phase of the RF energy until the observed level of modulation of the RF energy is one of reduced or removed comprises controlling the waveguide tuning circuitry of the coupling arm to shift the phase of the RF energy of the coupling arm from the plurality of coupling arms until the observed level of modulation of the RF energy of the coupling arm is one of reduced or removed.

19. The method of claim 15, wherein the adjustable phase shift circuitry comprises an adjustable phase shifter and a variable gain amplifier.

20. The method of claim 15, wherein the adjustable phase shift circuitry comprises quadrature amplifiers configured to shift a phase of the RF signal.

21. The method of claim 15, wherein the adjustable phase shift circuitry is further configured to shift the phase of the RF signal based, at least in part, on control signaling received from the wideband tracking modulator system.

* * * * *